Oct. 23, 1934.  O. M. OTTE  1,978,221
METHOD OF AND APPARATUS FOR TREATING METALLIC MATERIALS
Filed Sept. 13, 1932
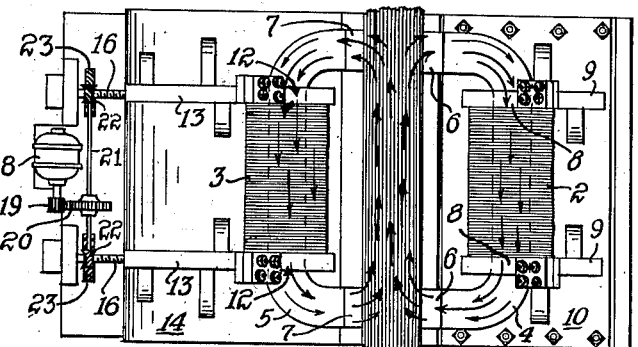
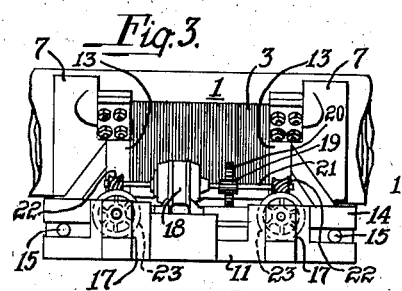
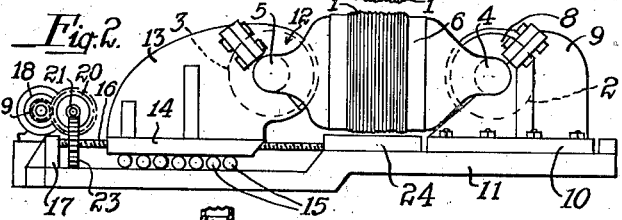
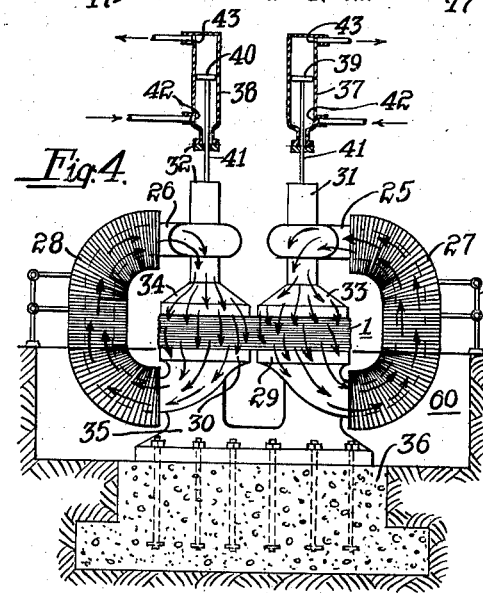
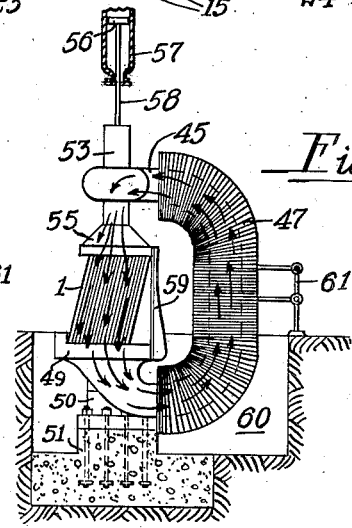
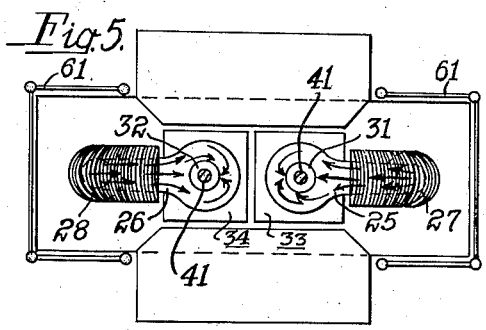
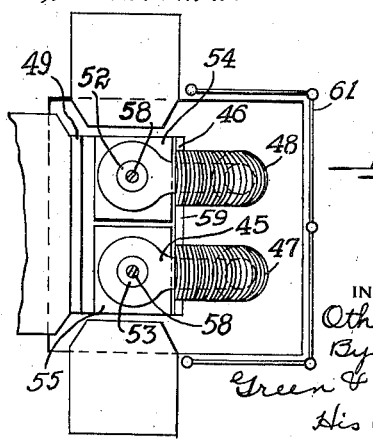
INVENTOR
Otho M. Otte
By
Green & McCallister
His Attorneys Patented Oct. 23, 1934

1,978,221

UNITED STATES PATENT OFFICE 1,978,221

METHOD OF AND APPARATUS FOR TREATING METALLIC MATERIALS

Otho M. Otte, Tarentum, Pa., assignor, by direct and mesne assignments, to Allegheny Steel Company, Brackenridge, Pa., a corporation of Pennsylvania Application September 13, 1932, Serial No. 632,958

13 Claims. (Cl. 175—21)

This invention relates to a method of and apparatus for treating metallic materials in order to improve the physical and/or magnetic properties thereof.

It is generally known to those skilled in this art that when metallic materials are worked or rolled, either hot or cold, fundamental changes occur in the molecular structure of the material. Some of these changes are manifest in the physical properties of the material, such as changes in hardness, ductility, and tensile strength, while others are manifest by changes in magnetic properties such as permeability and watt loss.

It has also been observed that some of the physical properties, such as hardness, are subject to periodic fluctuations which indicate that the electromagnetic system of molecules composing the material, is not stable.

It has been observed also that the magnetic properties of certain materials undergo fundamental changes during working and heat treatment, but that these changes are not uniform, as has been manifest by wide variations in permeability and watt loss.

For example, in the manufacture of electrical sheets, of silicon steel composition, different portions or areas of the same sheet will vary materially in the magnetic properties above-mentioned, and that sheets produced under the same conditions of temperature and rolling technique will vary materially in their magnetic properties as well as in their physical properties.

I am of the belief, founded on experience and observation of the variations in properties abovementioned, that the working of metal, whether hot or cold, even though accompanied by heat treatment, is not sufficient to produce orderly and uniform arrangement of the molecular structure so as to impart to the material the maximum of the available desired properties which are in the material.

Thus, for example, it is my belief that the physical properties of metal, whether paramagnetic or diamagnetic, may be immensely improved provided sufficient orderly arrangement of the molecular structure thereof is obtained. Likewise the magnetic properties of paramagnetic material may be enhanced provided sufficient and orderly arrangement of the molecular system is attained.

On these assumptions, I propose to work the material either to a finished or semi-finished state, and then heat the material to a temperature at which the molecules are relatively free to move and rearrangement of the crystals, both as to order and size, may take place. While the material is at such temperature, I propose to permeate the same with magnetic lines of force of such intensity that orderly arrangement and polarization or orientation of the molecular system are induced, and then to age and cool the material while under the influence of the magnetic lines of force. In some cases, mechanical pressure may be applied to the material while cooling, ageing and under the influence of magnetic lines of force. The magnetizing forces utilized may be periodic or aperiodic, and in either case, the forces may be varied in intensity throughout either a portion of or the entire process, or the intensity may be maintained at a predetermined value throughout.

While the above-described process is applicable to the treatment of metallic materials in general, it may also be resorted to as an adjunct or a continuation of the method disclosed in my U. S. Patent No. 1,909,887 dated May 16, 1933. In that patent a method is disclosed of working metallic materials in order to improve the physical and/or magnetic properties thereof. For example, in said patent, the rolling of electrical sheets while hot, at temperatures above the critical range, and being subjected to magnetizing forces; and the working of the materials, for example, the forging of metallic materials, while under the influence of such magnetic forces, are disclosed. Such treatment of the material, whether paramagnetic or diamagnetic, results in the improvement of its properties. In the case of electrical sheets produced under the method of said patent, the magnetic properties are improved.

While the method of this invention may have particular usefulness in the further treatment of materials, such as electrical sheets produced in accordance with my Patent No. 1,909,887, it is to be understood that I do not intend to limit myself to such use only.

An object of this invention is the provision of a method of treating semi-finished or finished material whereby the physical and/or magnetic properties thereof may be improved.

Another object of this invention is the provision of a method of magnetically ageing metallic materials which have been previously worked or rolled while under the influence of magnetic lines of force.

A still further object of the invention is the provision of a method of treating metallic materials whereby beneficial changes may be caused to occur within the composite structure thereof, such as may result in a more efficient product in respect to its useful properties.

Other objects of the invention will, in part, be apparent and will, in part, be obvious from the following description taken in conjunction with the accompanying drawing, in which:

Figs. 1, 2, and 3 are top plan, side, and end elevational views respectively, of apparatus that may be employed to carry out the method embodying the invention.

Figs. 4 and 5 are side elevation and top plan views respectively, of a modified form of apparatus adapted to carry the method of the invention into effect; and Figs. 6 and 7 are side elevation and top plan views respectively, of a still further modified form of apparatus adapted for use in the practice of the invention.

Throughout the drawing and specification, like reference characters indicate like parts.

The method of this invention may be put to effect by various forms of devices, and the several forms illustrated in the drawing are merely examples thereof.

The devices shown will be described in connection with the treatment of electrical sheets in pack form as they come from the mill, either in finished or semi-finished state, that is, either after the pack has been given the finishing pass, or before the final pass or passes have been made thereon.

Packs of electrical sheets that have been previously rolled or worked while under the influence of magnetizing forces, as disclosed in my Patent No. 1,909,887, or other materials whether previously worked in this manner, may be given the treatment or processing of this invention.

In the case of electrical sheets, I propose to heat the sheets, in pack form, to a temperature preferably above the critical range thereof, (that is, to a temperature above that at which the sheets exhibit or manifest an attraction for a magnet) prior to the magnetic ageing treatment of this invention.

With reference to Figs. 1, 2, and 3, material 1, herein indicated as a pack of electrical sheets, which has been heated to a temperature above the critical range thereof, is disposed in the magnetic circuit of a pair of electromagnets or magnetizing windings 2 and 3, which are wound on cores 4 and 5, respectively, of magnetic material. As shown the cores are substantially of U-shape. The ends of each core terminate in enlarged pole pieces 6 and 7, respectively, which are sufficiently extensive in one direction to span the width of the pack, and the length of each core is such that the pole pieces may engage the opposite ends of the pack. When the cores are arranged as shown in Figs. 1 and 2, two parallel magnetic circuits are provided, in both of which the pack of sheets is included. Thus, the pack of sheets or material under treatment, is permeated by the flux or magnetic lines of force developed in each circuit, that is, by the sum of the lines of force of these circuits.

Core 4 is mounted in bearings 8 formed in uprights 9 which constitute a part of a base plate 10 that is bolted or otherwise secured to a bed plate 11, preferably of non-magnetic material. Core 4 and winding 2 thereon are thus stationary with respect to the bed plate.

Core 5 is mounted in bearings 12 formed in uprights 13 that constitute a part of a base plate 14. Base plate 14 is mounted on roller bearings 15 disposed between the base plate and bed plate 11 so as to be movable towards or away from the pack of material under treatment.

In order that core 5 may be moved towards or away from the pack of material under treatment, a pair of screws 16 are provided. Screws 16 have screw-thread engagement with base plate 14, and are rotatably anchored in bearing blocks 17 secured to the bed plate. Screws 16 may be driven by means of an electric motor 18 which is coupled to the screws by means of a pinion 19 keyed to the motor shaft and a gear 20 which is keyed to a shaft 21 having worms 22 at the opposite ends thereof that mesh with worm wheels 23 keyed to the screws. Thus, by operating the motor in one direction, the screws will advance base plate 14 and the core carried thereby towards the pack of material under treatment.

Before a pack of material is inserted between the pole pieces of cores 4 and 5, motor 18 is operated in such a direction as to move core 5 away from the pack to allow sufficient clearance to accommodate the pack. The pack when in position, rests on a spacer 24 of non-magnetic material.

After locating the pack in the position shown in Figs. 1, 2, and 3, motor 18 is operated so as to advance core 5 into engagement with the pack of material. By controlling the motor, the pressure at which the pack is clamped between the pole pieces of the cores may be adjusted.

After the pack has been placed between the pole pieces of cores 4 and 5, and while the temperature of the pack is at or above its critical range, the magnetizing windings are connected to a source of current either alternating or direct depending upon which is best suited to the treatment of material. The intensity of the magnetizing forces should be such that sufficient magnetic lines of force will permeate the pack as may be required to cause such changes to occur in the molecular structure of the sheets as will result in improvement in the physical and/or magnetic properties thereof, preferably the latter, for instance, permeability and watt loss.

By improvement in the watt loss I contemplate such changes as will reduce the watt loss of the material.

As may be seen in Fig. 1, the lines of force permeate the material lengthwise and in the direction of the grain.

The magnetizing forces are maintained while the material cools and ages. The length of time that the material is subjected to the magnetizing forces and undergoing ageing and cooling may be determined by experiment. However, I prefer to carry on the ageing process while the material is subjected to magnetizing forces, until the desirable properties of the material have reached a stable condition.

In Figs. 4 and 5 of the drawing, a device is shown whereby magnetic lines of force may be passed through the sheets in a direction normal or perpendicular to the grain and to the plane of the sheets.

When the pack is treated in the device shown in Figs. 4 and 5, it is placed flatwise and in a horizontal position within the magnetic circuits formed by cores 25 and 26 on which magnetizing windings 27 and 28, respectively, are wound. The cores terminate at their lower ends in relatively broad pole pieces 29 and 30 on which the material is placed. The upper ends of the cores terminate in journals in which solid cylinders 31 and 32 of magnetic material are disposed for vertical movement. The lower ends of these cylinders terminate in pole pieces 33 and 34 of substantially the same area as pole pieces 29 and 30.

Cores 25 and 26 are stationarily mounted on a support 35, of non-magnetic material, of substantially U-shape, which is bolted or otherwise secured to a foundation 36.

In order that pole pieces 33 and 34 may be raised to facilitate the insertion or removal of a pack of sheets, cylinders 37 and 38 are provided in which pistons 39 and 40 are disposed and connected to the cylinders 31 and 32 by means of rods 41. The pistons working in these cylinders are double-acting so that when pressure is admitted to ports 42 upward movement of poles pieces 33 and 34 is obtained. When the pole pieces have been raised to the proper height, a pack of material which has been previously heated to the proper temperature, is placed on pole pieces 29 and 30, after which pressure is admitted to the opposite side of pistons 39 and 40 through ports 43 whereby pole pieces 33 and 34 are forced into engagement with the material. When the magnetizing windings 27 and 28 are energized, either with direct or with alternating current, pole pieces 33 and 34 will be attracted towards pole pieces 29 and 30 and thereby increase the pressure exerted on the pack of sheets. The ageing of a pack of sheets in a machine or device such as shown in Figs. 4 and 5 may be continued and regulated or controlled in the same manner as the treatment would be performed as described in connection with the device shown in Figs. 1, 2, and 3.

In Figs. 6 and 7 of the drawing, a device is shown whereby a pack of sheets may be disposed on edge and magnetic lines of force passed through the sheets from edge to edge at right angles to the direction of the grain. The device of Figs. 6 and 7 comprises a pair of cores 45 and 46 of substantially U-shape, on which magnetizing windings 47 and 48 are wound. The lower ends of the cores are connected to a relatively broad pole piece 49 which is mounted on a support 50 of non-magnetic material which is bolted or otherwise secured to a foundation 51.

The upper ends of these cores terminate in journals through which plungers 52 and 53, of magnetic material extend. The lower ends of these plungers terminate in relatively broad-faced pole pieces 54 and 55 adapted to engage the sheets or material under treatment. Pole pieces 54 and 55 may be raised or lowered by means of double-acting pistons 56 disposed in cylinders 57. The pistons are connected by means of rods 58 to the plungers 52 and 53. By controlling the direction of the admission of pressure to the cylinders with respect to the pistons, pole pieces 54 and 55 may be raised or lowered as desired.

In order that the pack may be held in a position such as shown in Fig. 6, when placed on pole piece 49 a guide 59 preferably of non-magnetic material is provided. This guide is secured at its lower end to pole piece 50.

The devices shown in Figs. 4 and 5, and 6 and 7 may be disposed in pits 60 so that the pole pieces 29, 30, and 49, of the machine or devices shown in these figures, may be located at approximately the floor line of a factory in which they may be used.

If these devices are mounted in pits, the pits may be guarded by means of guard-rails 61.

While a preferred form of the method has been described herein, and while several forms of devices have been illustrated by means of which the method is carried into effect, it is to be understood that the method and the apparatus may be varied and modified without departing either from the spirit or the scope of the invention. It is desired, therefore, that only such limitations shall be placed on the invention as are imposed by the prior art and the appended claims.

What I claim as new and desire to secure by Letters Patent is:

1. The method of treating metallic materials to improve the physical and/or magnetic properties thereof that comprises heating the material to relatively high temperature as to or above the critical temperature thereof applying static mechanical forces to the material to compress the same, and then allowing the material to cool in a magnetic field while under compression.

2. The method of treating metallic materials to improve the physical and/or magnetic properties thereof that comprises heating the material to relatively high temperature of the order of the critical temperature of the material, applying static mechanical pressure to the material, and then in permeating the material with magnetic lines of force while at such temperature.

3. The method of improving the physical and/or magnetic properties of metallic materials that comprises heating the material to a temperature above the critical range thereof, applying static mechanical pressure to the material, permeating the material with magnetic lines of force while under pressure and at such temperature, and allowing the material to cool while under the influence of said lines of force.

4. The method of improving the physical and/or magnetic properties of metallic materials that comprises heating the material to about the critical temperature thereof, applying static mechanical forces to the material to place it in compression, and then in permeating the material while hot with magnetic lines of force in a direction parallel to the grain of the material while under compression.

5. The method of improving the physical and/or magnetic properties of metallic materials that comprises heating the material to about the temperature at which molecular rearrangement occurs, applying static compression forces to the material, and then in permeating the material with magnetic lines of force in a direction parallel to the grain thereof while under compression.

6. The method of improving the physical and/or magnetic properties of metallic materials that comprises heating the material to a temperature at which molecular rearrangement occurs, applying static mechanical compression forces to the material, permeating the material with magnetic lines of force in a direction parallel to the grain thereof, while under pressure and at such temperature, and allowing the material to cool while under the influence of said lines of force and compression forces.

7. The method of improving the physical and/or magnetic properties of metallic materials that comprises heating the material to or above the critical temperature thereof, applying static mechanical compression forces to the heated material, and then cooling and ageing the material while in compression, in a magnetic field of sufficient intensity to produce those fundamental changes in the molecular structure thereof that result in improvement of its physical and/or magnetic properties thereof.

8. The method of improving the physical and/or magnetic properties of semi-finished ferrous material that has previously been rolled through one or more passes while subjected to magnetic lines of force, that comprises heating the material to a temperature above that at which it manifests attraction for a magnet, placing the material within a magnetic circuit, stressing the material in static compression, applying magnetizing forces to the circuit of sufficient intensity to permeate the material with magnetic lines of force and allowing the material to cool to temperatures at which it becomes magnetic.

9. The method of improving the physical and/or magnetic properties of semi-finished metallic material that has previously been rolled through one or more passes while subjected to magnetic lines of force, that comprises heating the material to a temperature above that at which it manifests attraction for a magnet, placing the material within a magnetic circuit, stressing the material in static compression, applying magnetizing forces to the circuit of sufficient intensity to permeate the material, with magnetic lines of force, and allowing the material to age and cool while under stress in said magnetized circuit.

10. The method of improving the physical and/or magnetic properties of semi-finished metallic material that has previously been rolled through one or more passes while subjected to magnetic lines of force, that comprises heating the material to a temperature above that at which it manifests attraction for a magnet, placing the material within a magnetic circuit and stressing the material in static compression, applying magnetizing forces to the circuit of sufficient intensity to permeate the same with magnetic lines of force, and allowing the material to age and cool while under the stresses of magnetization and compression to a temperature below that at which it manifests attraction for a magnet.

11. The method of improving the physical and/or magnetic properties of metallic materials in sheet or strip form that comprises forming a pack of sheet or strip material, heating the pack to a temperature at which molecular rearrangement occurs, stressing the material in static compression, and then in permeating the pack, while in compression, with magnetic lines of force in a direction across the grain from edge to edge thereof.

12. The method of improving the physical and/or magnetic properties of metallic materials in sheet or strip form that comprises forming a pack of such material, heating the material to or about its critical temperature, statically stressing the material in compression, and then in permeating the material, while in compression, with magnetic lines of force in a direction at an angle to the plane of the sheets and across the grain thereof.

13. The method of improving the physical and/or magnetic properties of metallic materials that comprises heating the material to a relatively high temperature such that there may be relatively free movement of the molecular system and rearrangement of the crystals, placing the material within a magnetic circuit, statically stressing the material in compression, applying magnetizing forces to the circuit of sufficient intensity to permeate the material with magnetic lines of force, and allowing the material to cool while magnetized and under compression until substantial stability of the molecular system occurs.

OTHO M. OTTE.